UNITED STATES PATENT OFFICE.

ARTHUR C. SPENCER AND EDWIN C. ECKEL, OF WASHINGTON, DISTRICT OF COLUMBIA.

PROCESS OF MAKING CEMENT.

1,209,219.  Specification of Letters Patent.  Patented Dec. 19, 1916.

No Drawing.  Application filed June 6, 1910.  Serial No. 565,387.

*To all whom it may concern:*

Be it known that we, ARTHUR C. SPENCER and EDWIN C. ECKEL, citizens of the United States, residing at Washington, in the District of Columbia, have invented certain new and useful Improvements in Processes of Making Cement, of which the following is a specification.

This invention relates to processes of making cement; and it comprises a method of making a cementitious composition wherein a natural iron silicate is heated with calcareous material until clinkering is effected; all as more fully hereinafter set forth and as claimed.

While the proximate constitution of ordinary Portland cement clinker is not definitely known, it is usually assumed to be, in substance, a mixture of aluminate of lime and silicate of lime; aluminum sesquioxid playing the part of an acid constituent. Other sesquioxids can replace the alumina in whole or in part and where the replacement is by ferric oxid a dense dark cement is produced which has valuable properties for many purposes; as for use in sea-water, sewer construction and in mines the waters of which carry acids and especially sulfuric acid and sulfates. It is however somewhat difficult to make this ferric cement technically under ordinary cement kiln conditions from a mixture of the ordinary form of silica, with iron ore and lime or limestone since the reaction is not ready and high temperatures are requisite; this high temperature in turn tending to produce a clinker in comparatively large masses which are difficult to comminute, iron cement being usually hard. Silica in the ordinary form of sandy or quartzose silica and the quartzose gangue of ores is very little reactive under cement kiln conditions. Ferric oxid *per se* does not readily combine with lime and silica and, apart from the difficulty of causing reactions in any comparatively infusible powder, in any artificial mixture of these bodies the mutual contact and the uniformity and intimacy of admixture are imperfect. In order to obtain any union at all with a mixture of lime, iron ore and sand, the ingredients must be reduced to an impalpable state of subdivision; an operation which is expensive. As will be obvious, the conditions for making such a cement are not as favorable as in the manufacture of ordinary Portland cement where the alumina is already in chemical combination with one of the other ingredients of the mixture: the silica. In a chemical combination admixture is of course molecular. In making Portland cement from clay, the lime has merely to react with the aluminum silicate whereas in making a cement from the described mixture of iron ore, sand and lime the lime must probably mostly first combine with the silica and then the silicate react with the ferric oxid. This reaction is not ready. Moreover, oxid iron ores are relatively expensive, and in this country, are not usually available near the seaboard where the iron cement is most in demand. We have discovered that any of the natural silicates of iron can be very advantageously employed to produce iron cement. In such silicates of iron the silica and the oxid are of course in molecular contact; are in an admixture which is not possible to produce mechanically, even by the most intimate mixing. With these silicates of iron therefore the reaction with lime is quick and ready and does not require undue temperatures. These natural silicates are soft and can readily be reduced to fine uniform powders well suited for mixing with the calcareous materials while where containing ferrous iron, on oxidation on heating in contact with calcining limestone in the first stages of the cement making operation they tend to break down and become even finer. The industrial waste slags and similar materials derived from copper and lead furnaces, iron refining operations and the like are not only unduly hard but have no constant composition while they usually contain many other things than iron silicates. The natural silicates, such as glauconite, on the other hand, occur in relatively soft granules which are readily comminuted and as readily intimately admixed with the other components of the cement mixture. And these silicates occur in large beds of relatively uniform composition. They are ordinarily free of undesirable metallic oxids such as the oxids of the heavy metals. Clinker can readily be produced from these natural silicates of iron in admixture with lime in ordinary cement kilns, such as rotary kilns, and by the ordinary procedures. Where the silicate of iron comprises a ferrous silicate, it is necessary to oxidize the ferrous iron, but this can be done in the cement making operation itself. Ferrous iron is basic and in a cement mixture tends more or less to replace lime whereas the ferric oxid is a sesquioxid and tends to replace alumina; that is, it is an acid constituent. With certain of these natural silicates there is given the possibility of recovering valuable by-products which add materially in cheapening the cost of operation. For this purpose, the silicate known as glauconite is particularly desirable since it contains considerable percentages of potash which may be fumed off and recovered as a by-product. This mineral occurs in large deposits along the seaboard; and in many places the glauconite is associated with shell marl which may be used as a source of lime. For the present purposes glauconite may be regarded as a double silicate of potassium and iron, the proportion of potash varying between 4 and 16 per cent. Upon heating a mixture of this silicate with lime, limestone, or marl, a number of reactions occur. The limestone loses its carbon dioxid, or is calcined, any ferrous iron present becomes ferric iron by oxidation and the ferric iron, lime and silica unite to form a clinker. In this operation the potash is, or may be, largely expelled by volatilization as fumes which may be caught and recovered.

A good iron cement may be made by clinkering a mixture of glauconite and lime, using lime in sufficient amount to unite with the acid bonds of the silica and of the ferric oxid and alumina present. Any ferrous oxid present in the mixture will be oxidized to ferric oxid prior to clinkering. A composition of good cementitious properties may be made from a mixture giving about 60–66 parts lime, 8–13 parts of ferric oxid and alumina and the residue silica, etc. The lime may be mixed with the glauconite as such or in the form of limestone, shells, or the like, calcium carbonate being calcined and converted to lime during the operation.

The apparatus used may be an ordinary rotary cement kiln. It is less desirable to perform the operation upon the briqueted material in the older types of stationary cement burning devices for the reason that this does not give an opportunity for free oxidation of such ferrous iron as may be present or for free evolution of potash in fuming off the latter. The potash fumes evolved during the operation can be caught and recovered in the kiln dust. As this dust is largely caustic and carbonated lime it is in and of itself a good fertilizer and its fertilizing value increases in direct proportion to the amount of potash which can be recovered with it. Most of the potash is evolved in the higher temperature stages of the operation and to secure a good recovery of the potash it is better to maintain the material at a clinkering temperature for some length of time. This clinkering temperature should however not be excessive. Other things being equal, the evolution of potash at any given temperature is proportional to the surface of material exposed to the kiln gases and to the time of such exposure. It is therefore better to use a rotary kiln with powdered material and give a protracted exposure at a temperature and under conditions where the clinkers will not agglomerate into large masses or fuse down. The powdered mixture travels down through a rotary kiln as a thin agitated stream underlying a countercurrent of flame and flame gases giving ideal conditions for fuming off potash. Operating in a rotary kiln, the rotation and thermal conditions should therefore be so controlled in the clinkering zone as to give a good period of exposure without forming large bodies of clinkers. The formation of such large bodies is furthermore inadvisable for the reason stated that iron cement is relatively hard and difficult to grind. Since chlorid of potassium is rather more volatile than the oxidized compounds of potassium, the recovery of potash may be facilitated by mixing a small proportion of calcium chlorid with the original mixture. Under the influence of the clinkering heat the chlorin and the potash are displaced and fumed off as potassium chlorid. Whether the fumes are evolved as chlorid or as oxid, carbonate or other salts or compounds formed under the influence of the flame gases and vapors, the potash under well known laws largely tends to condense upon the dust particles in the gases going through the kiln and is therefore carried over the dust chamber.

While, as stated, in using glauconite the operation can be performed in the ordinary type of rotary kilns and by the ordinary processes it is much better to perform the operation in a methodical manner. By so doing a number of advantages are gained. The mixture may first be calcined almost completely. At the comparatively low temperature of calcination relatively little potash is evolved and the dust coming from this partial calcination contains little potash. In the calcining operation there is always a considerable evolution of dust and this dust is carried forward by the kiln gases. Calcination is a low temperature operation in which large volumes of gases are necessarily employed and the larger the volume of gases the more difficult the complete recovery of potash fumes. By now resuming and completing the calcination with subsequent clinkering as another stage in the operation, comparatively little dust is evolved and with this small quantity of dust is recovered all the potash which is evolved in the clinkering operation. Clinkering is a high temperature operation in which but a small volume of gases need be employed so that the evolved potash is not distributed through a large body of gases. A dust-like material is thus obtained which carries much more potash and is much more valuable as a fertilizer. In practice the cement mixture may be passed down through a rotary kiln, which may be separately fired, and there partially calcined. The partially calcined material may now be transferred to another rotary, the calcination completed and the calcines clinkered. For this operation a pair of communicating rotary kilns may be employed, the kilns in which the final calcination and the clinkering are effected being provided with separate dust chambers. The clinkering kiln may be provided as usual with flame producing means using powdered coal, gas, oil, etc. The hot gases from the clinkering kiln may be transferred to the calcining kiln and used for effecting the calcination, or, as stated, the calcining kiln may be separately fired. The natural silicates often contain considerable water. If desired the mixture may be first roasted and dehydrated in still another kiln, the waste gases from the calcining kiln being employed for this purpose. Or the roasting and dehydration may be effected in the calcining kiln proper.

The calcination may of course be performed in a rotary and the clinkering in a stationary furnace; or the reverse. The material may be first calcined in a vertical kiln and then finished in a rotary. Or the lime may be first calcined in the ordinary manner and then mixed with the greensand. Many other modifications are possible within the purview of our invention.

This methodical method of treatment is also useful in making ordinary alumina cement and recovering potash where potassiferous silicates, such as feldspar, mica, granite, etc., form a part of the raw materials. These potassiferous mineral materials may be mixed with lime or limestone in the manner described and methodically treated to make cement and fume off potash in the same manner as just described for the glauconite mixture, the barren dust due to the first part of the calcining operation, and the richer potassiferous dust due to the finishing calcination and the clinkering being separately collected.

Greenalite is another natural iron silicate which, though not potassiferous, is regarded as a variety of glauconite and may be used in the present invention.

Mixed cements may be made by using various natural silicates containing both iron and alumina and for some purposes cements of intermediate composition are advantageous. Many of these mixed silicates are, however, rather hard and they are generally massive. Glauconite and greenalite are of better physical consistency for the present purposes.

What we claim is:—

1. The process of preparing a cement clinker and by-products which comprises heating a potassiferous natural iron silicate of the glauconite type with a calcareous material until clinkering ensues and the potash is fumed off and recovering the potash evolved in the heat treatment.

2. The process of preparing a cement clinker and by-products which comprises heating a potassiferous natural iron silicate of the glauconite type with a calcareous material until clinkering ensues and the potash is fumed off and recovering the potash evolved in the heat treatment together with evolved dust.

3. The process of preparing a cement clinker and recovering potash which comprises heating together a charge composed substantially of calcareous material and a mineral comprising a double silicate of potassium and cement-forming oxid until clinkering ensues and fumes of potassium compounds are evolved, the heating being continued until a substantial proportion of the potassium compounds present are removed from the mixture, and recovering the fumes of potassium compounds evolved in such clinkering.

4. The process of preparing a cement clinker and recovering potash which comprises heating together a charge composed substantially of calcareous material and a mineral comprising a double silicate of potassium and cement-forming oxid until clinkering ensues and fumes of potassium compounds are evolved, the heating being continued until a substantial proportion of the potassium compounds present are removed from the mixture, and recovering the potassium compounds evolved in such clinkering together with evolved dust.

5. The process of preparing a cement clinker and by-products which comprises heating a double silicate of potassium and a cement-forming oxid together with calcareous material until clinkering ensues, such heating being done in a plurality of steps and being so controlled in one such step as to liberate more potash than in another such step, and the dust or dust and fume evolved in each such step being separately collected.

6. The process of preparing a cement clinker and by-products which comprises heating a potassiferous natural iron silicate of the glauconite type together with calcareous material until clinkering ensues, such heating being done in a plurality of steps and being so controlled in one such step as to liberate more potash than in another such step, and the dust or dust and fume evolved in each such step being separately collected.

7. The process of preparing an iron cement which comprises heating a cement mixture comprising glauconite and calcareous material until clinkering ensues.

8. The process of preparing an iron cement and by-products which comprises heating a cement mixture comprising glauconite and calcareous material until clinkering ensues and collecting the evolved potash with the evolved dust.

9. The process of preparing an iron cement and by-products which comprises heating a cement mixture comprising glauconite and calcareous material until clinkering ensues and collecting the evolved potash with the evolved dust, such heating being performed in a plurality of stages and the dust from each stage being separately collected.

10. In a process of making cement clinker and by-products, the process which comprises heating a mixture of a potassiferous silicate and calcareous material to a calcining temperature until calcination is partly effected, collecting the dust from this operation, resuming the heating until calcination is completed and clinkering effected and separately collecting the dust from the second heating stage.

11. In the process of making cement clinker and by-products, the process which comprises heating a mixture comprising a potassiferous iron silicate and calcareous material to a calcining temperature until calcination is partly effected, collecting the dust from this operation, resuming the heating until calcination is completed and clinkering effected and separately collecting the dust from the second heating stage.

12. In the process of making cement clinker and by-products, the process which comprises heating a mixture comprising glauconite and a calcareous material to a calcining temperature until calcination is partly effected, collecting the dust from this operation, resuming the heating until calcination is completed and clinkering effected and separately collecting the dust from the second heating stage.

13. The process of producing cement and potash which comprises heating a mixture of a calcareous material and a double silicate of potassium and a cement-forming oxid by transmitting the same through a rotary kiln against a current of heating gases passing in an opposed direction to form a cement clinker and fumes of potassium compounds, and collecting the clinker and the fumes for use.

14. Process of manufacturing simultaneously alkali and hydraulic cement, which consists in mixing, in such condition as to permit chemical reaction of the ingredients of the mixture when highly heated, alkaliferous mineral matters that contain combined oxid of an alkali metal, silica and iron with calciferous material at least sufficient to replace the combined alkali, heating the mixture under such reacting conditions as to volatilize the alkali as an oxygen compound and leave a residue of cement material and separately collecting the residue and the volatilized alkali.

15. The process of simultaneously manufacturing cement clinker and alkali, which comprises mixing a mineral containing a compound of silica, a cement forming oxid and a metal of the alkalis with a calciferous material containing oxygen and sufficient calcium to replace the alkali metal and heating the same at a temperature sufficient to cause said replacement and to volatilize the alkali set free and clinker the residue.

16. Process of manufacturing simultaneous alkali and hydraulic cement, which consists in mixing, in such condition as to permit chemical reaction of the ingredients of the mixture when highly heated, alkaliferous mineral matters that contain combined oxid of alkali metal, silica and a sesquioxid with calciferous material at least sufficient to replace the combined alkali, heating the mixture under such reacting conditions as to volatilize the alkali as an oxygen compound and leave a residue of cement material and separately collecting the residue and the volatilized alkali.

17. The process of recovering potash which comprises forming a mixture of a native mineral containing silica, a cement forming oxid and potash with at least enough calcareous material to furnish CaO equivalent to $K_2O$, heating the mixture sufficiently to fume off potash and collecting the potash so fumed off.

18. The process of simultaneously manufacturing cement clinker and alkali, which comprises reacting, under suitable heat conditions, upon a mineral containing a double silicate of iron and an alkali metal, with calciferous material containing sufficient calcium to replace the alkali metal in said mineral and capable of setting alkali free, whereby said alkali will be volatilized, leaving a cement clinker residue.

19. Process of manufacturing simultaneously alkali and hydraulic cement, which consists essentially in mixing in a pulverized state a double silicate of cement-forming oxid and an alkali metal, with calciferous matters containing at least sufficient calcium to replace the combined alkali metal and capable of liberating alkali, heating the mixture until the alkali is volatilized and the residue forms cement clinker, collecting the alkali and grinding the residue to cement, substantially as and for the purpose set forth.

20. The process of simultaneously manufacturing cement clinker and alkali, which comprises reacting, under suitable heat conditions, upon a mineral containing a double silicate of cement-forming oxid and an alkali metal, with calciferous material containing sufficient calcium to replace the alkali metal in said mineral and capable of setting alkali metal compounds free, whereby said alkali compounds will be volatilized, leaving a cement clinker residue.

21. In the simultaneous manufacture of alkali and hydraulic cement, the process which comprises reacting upon a double silicate of cement-forming oxid and a metal of the alkalis with a calciferous oxygen compound containing sufficient calcium to replace the alkali metal in said mineral and capable of liberating the alkali, said compound being in quantity sufficient to replace substantially all of said alkali metal in the mineral, such replacement taking place under sufficient heating to volatilize the alkali liberated and leave a residue of cement material, and separately collecting the residue and the volatilized materials.

22. The process of manufacturing simultaneously alkali and hydraulic cement, which comprises reacting upon a double silicate of cement-forming oxid and a metal of the alkalis, with lime sufficient to replace and liberate alkali, such replacement taking place under sufficient heating to volatilize the alkali liberated and leave a residue of cement material and separately collecting the residue and the volatilized materials.

23. Process of manufacturing simultaneously alkali and hydraulic cement, which consists essentially in mixing in a pulverized state a double silicate of cement-forming oxid and an alkali metal with calciferous material having at least sufficient calcium to replace the combined alkali metal and capable of liberating alkali metal compounds, heating the mixture to the temperature of volatilizing of the alkali metal compounds in a current of gases which are capable of reacting with the volatilized alkali compounds to form other alkali metal compounds, collecting the alkali metal combination and grinding the residue to cement, substantially as and for the purpose set forth.

24. The process of simultaneously manufacturing cement clinker and alkali, which comprises reacting, under suitable heat conditions and in an atmosphere containing flame gases upon a mineral material containing a double silicate of cement-forming oxid and an alkali metal, with calciferous material containing sufficient calcium to replace the alkali metal in said mineral material and capable of setting alkali metal compounds free, whereby said alkali will be volatilized, leaving a cement clinker residue.

In testimony whereof, we affix our signatures in the presence of witnesses.

ARTHUR C. SPENCER.
EDWIN C. ECKEL.

Witnesses for Spencer:
 WM O. TUFTS,
 GAEL S. HOAG.

Witnesses for Eckel:
 K. P. MCELROY,
 ALBERT C. WEST.